(12) United States Patent
Keshet et al.

(10) Patent No.: US 10,087,626 B2
(45) Date of Patent: Oct. 2, 2018

(54) NUT AND METHOD FOR FIXING AN OBJECT TO A BUILDING STRUCTURE

(71) Applicant: UMZEN LTD., Airport City (IL)

(72) Inventors: Itamar Keshet, Givatayim (IL); Tomer Yehezkely, Ramat Gan (IL)

( * ) Notice: Subject to any disclaimer, the term of this patent is extended or adjusted under 35 U.S.C. 154(b) by 123 days.

(21) Appl. No.: 15/125,168

(22) PCT Filed: Feb. 22, 2015

(86) PCT No.: PCT/IL2015/050199
§ 371 (c)(1),
(2) Date: Sep. 11, 2016

(87) PCT Pub. No.: WO2015/145420
PCT Pub. Date: Oct. 1, 2015

(65) Prior Publication Data
US 2017/0096816 A1    Apr. 6, 2017

(30) Foreign Application Priority Data
Mar. 26, 2014  (IL) .......................................... 231729

(51) Int. Cl.
*E04B 9/20* (2006.01)
*F16B 5/02* (2006.01)
*F16B 37/04* (2006.01)
*F16B 37/12* (2006.01)
*E04B 9/18* (2006.01)

(52) U.S. Cl.
CPC .................. *E04B 9/20* (2013.01); *E04B 9/18* (2013.01); *F16B 5/0233* (2013.01); *F16B 37/041* (2013.01); *F16B 37/127* (2013.01)

(58) Field of Classification Search
CPC .... F16B 5/0233; F16B 37/125; F16B 37/041; F16B 37/127; F16B 33/002; E04B 9/20
USPC ................................. 81/121.1; 411/178, 411
See application file for complete search history.

(56) References Cited

U.S. PATENT DOCUMENTS

| | | | | |
|---|---|---|---|---|
| 4,361,943 A | * | 12/1982 | Kobusch ............... | F16B 37/125 29/240 |
| 4,439,078 A | * | 3/1984 | Dessouroux .......... | F16B 37/125 29/426.5 |
| 2016/0327081 A1 | * | 11/2016 | Mair ......................... | E04C 2/46 |

FOREIGN PATENT DOCUMENTS

| | | |
|---|---|---|
| AU | 742464 | 1/2002 |
| RU | 2145393 | 2/2000 |
| WO | WO 0112917 | 2/2001 |

\* cited by examiner

*Primary Examiner* — Hadi Shakeri
(74) *Attorney, Agent, or Firm* — Alphapatent Associates, Ltd; Daniel J. Swirsky

(57) ABSTRACT

A nut (10), comprising: a female thread (34) for threading a bolt (14) thereinto; a head (52) surrounding the female thread (34), for holding the female thread (34), for allowing rotating the bolt (14) in relation to the female thread (34); and a self-tapping thread (36), for threading the nut (10) through an object (18), the self-tapping thread (36) characterized in not providing linear pacing in relation to the object (18) upon rotation therebetween upon completing the threading therebetween, wherein the self-tapping thread (36) may comprise the female thread (34) for threading the bolt (14) therethrough, thereby allowing connecting the nut (10) to the object (18) and then moving the bolt (14) in relation to the object (18), thereby allowing fixing the object (18) to a building structure (20) at an adjustable distance (40).

3 Claims, 9 Drawing Sheets

FIG 1 - PRIOR ART

FIG 4 - STEPS 1,2,3

NUT AND METHOD FOR FIXING AN OBJECT TO A BUILDING STRUCTURE

CROSS-REFERENCE TO RELATED APPLICATIONS

This application is a U.S. National Phase Application under 35 U.S.C. 371 of International Application No. PCT/IL2015/050199, which has an international filing date of Feb. 22, 2015, and which claims priority from Israel Patent Application No. 231,729, filed Mar. 26, 2014, the disclosures of which are incorporated herein by reference in their entirety.

TECHNICAL FIELD

The present invention relates to the field of building construction. More particularly, the invention relates to a method and apparatus for fixing an object to a building structure.

BACKGROUND ART

In various cases, objects, such as plates or profiles of drywall construction, are fixed to building construction, such as to the ceiling, in a distance from the building construction.

The adjustment of the plate to the building construction typically applies two nuts, each at another side of the plate.

This fixing is disadvantaged in that one of the nuts is disposed behind the plate.

The method described above has not yet provided satisfactory solutions to the long felt need for convenient fixing of objects at a distance from the building structure.

It is an object of the present invention to provide a method and apparatus for convenient fixing of objects at a distance from the building structure.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a nut (10), comprising:
- a female thread (34) for threading a bolt (14) thereinto;
- a head (52) surrounding the female thread (34), for holding the female thread (34), for allowing rotating the bolt (14) in relation to the female thread (34); and
- a self-tapping thread (36), for threading the nut (10) through an object (18), the self-tapping thread (36) characterized in not providing linear pacing in relation to the object (18) upon rotation therebetween upon completing the threading therebetween,
- wherein the self-tapping thread (36) may comprise the female thread (34) for threading the bolt (14) therethrough, thereby allowing connecting the nut (10) to the object (18) and then moving the bolt (14) in relation to the object (18) either by rotating the bolt (14) in relation to the nut (10), or by rotating the nut (10) in relation to the object (18), thereby allowing fixing the object (18) to a building structure (20) at an adjustable distance (40).

The character of the self-tapping thread (36) of not providing linear pacing in relation to the object (18) upon rotation therebetween upon completing the threading therebetween, may comprise a space (48) between an internal binding end (44) of the self-tapping thread (36) and an adjacent surface (38) of the nut (10), the space (48) being substantially larger than a thickness (84) of the object (18), for allowing the object (18) rotate within the space (48).

The nut (10) may further comprise an elastic washer (46), disposed in the space (48), for limiting movement between the self-tapping thread (36) and the object (18) upon completing the threading therebetween.

The character of the self-tapping thread (36) of not providing linear pacing in relation to the object (18) upon rotation therebetween upon completing the threading therebetween, may comprise an internal binding (44C) being thinner than the other bindings (44B), thereby upon rotating the nut (10) in relation to the object (18) in the closing direction (64), a bending (88) in a hole (54) in the object (18) bends the end (90) of the internal binding (44C), thereby removing the bending (88) of the object (18) from the gap (86) between the bindings (44B, 44C) of the self tapping thread (36).

A tool (60) may be provided
for rotating the bolt (14) threaded into the inventive nut (10), upon rotating to the closing direction (64), and
for releasing the bolt (14) therefrom upon rotating to the opening direction, the tool (60) comprising:
- a first female thread (62), for threading a male thread (66) of the bolt (14) thereinto; and
- a tightening element (32) pressing the male thread (66) of the bolt (14) outside from the female thread (62), thereby providing friction therebetween.

The gripping tool (60) may further comprise:
- a male thread (42), for pressing the tightening element (32); and
- a second female thread (68) fitting to the male thread (42), wherein paces (70) of the male (42) and second female (68) threads are significantly greater than a pace of the thread (66) of the bolt (14), thereby opening the male thread (42) from the second female thread (68) for releasing the tightening element (32), before opening the bolt (14).

In another aspect, the present invention is directed to a method for fixing an object (18) to a building structure (20), the method comprising the steps of:
- connecting a nut (10) to the object (18), the connection characterized in no linear pacing between the nut (10) and the object (18) upon rotation therebetween;
- fixing a wall socket (16) to the building structure (20);
- screwing a bolt (14) into the nut (10) and into the wall socket (16) until fixing the bolt (14) to the wall socket (16), while not allowing rotation of the nut (10); and
- upon the fixing of the bolt (14) to the wall socket (16), rotating the nut (10), for adjusting the distance (40) between the object (18) and the building structure (20).

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

Figure 1:
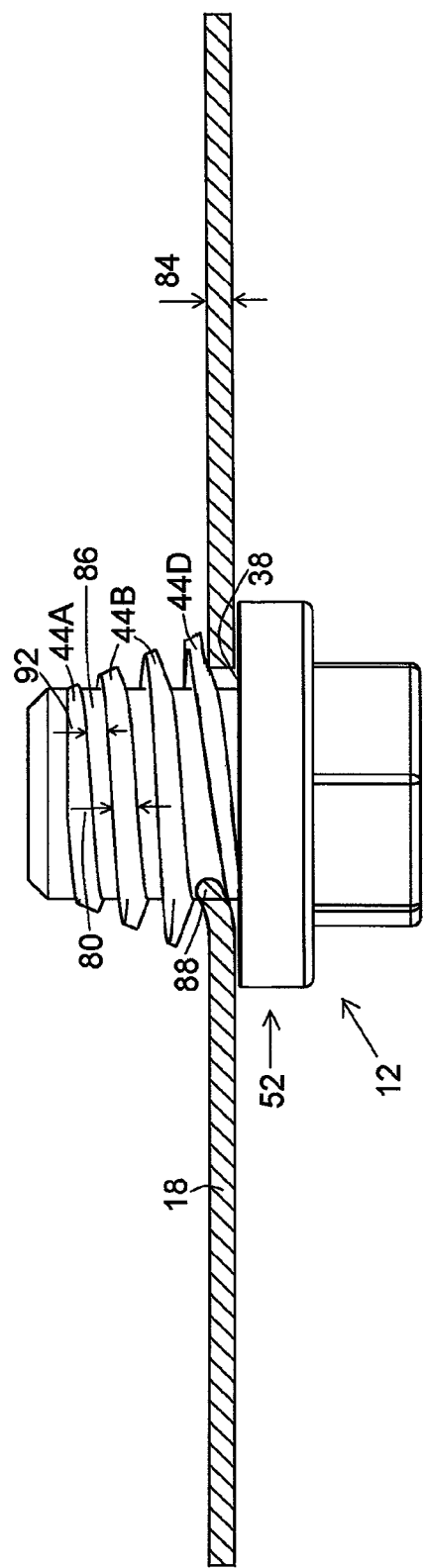
FIG. 1 depicts a prior art self threading nut and a plate into which the nut is threaded.

FIG. 1 depicts a prior art self threading nut and a plate into which the nut is threaded.

The term "self-tapping thread" refers herein to a thread having a widening perimeter, for producing a thread in a substance by rotation of the thread in relation to the substance.

The term "self-tapping nut" refers herein to a nut having a self-tapping thread.

A prior art self-tapping nut includes a self-tapping thread, in which except for the external binding 44A, the widths 80 of all the bindings, including the internal binding 44D and the central bindings 44B are substantially equal; and the width 92 of each gap 86 between the bindings is substantially equal to the width 80 of the bindings.

The internal binding 44D reaches the surface 38 of head 52.

Upon insertion of the self-tapping thread into a pre-fitted hole 54 (shown in FIG. 3) of a plate 18 having a thickness 84, substantially equal to width 92 of gap 86, the external binding 44A produces a local bending 88, which enlarges further by the central bindings 44B.

Bending 88 inserts into gap 86 between the bindings (44A, 44B, 44D), and leads the threading, either to close the nut until the last binding 44D contacts surface 38 or a washer, or to open the thread.

Figure 2:
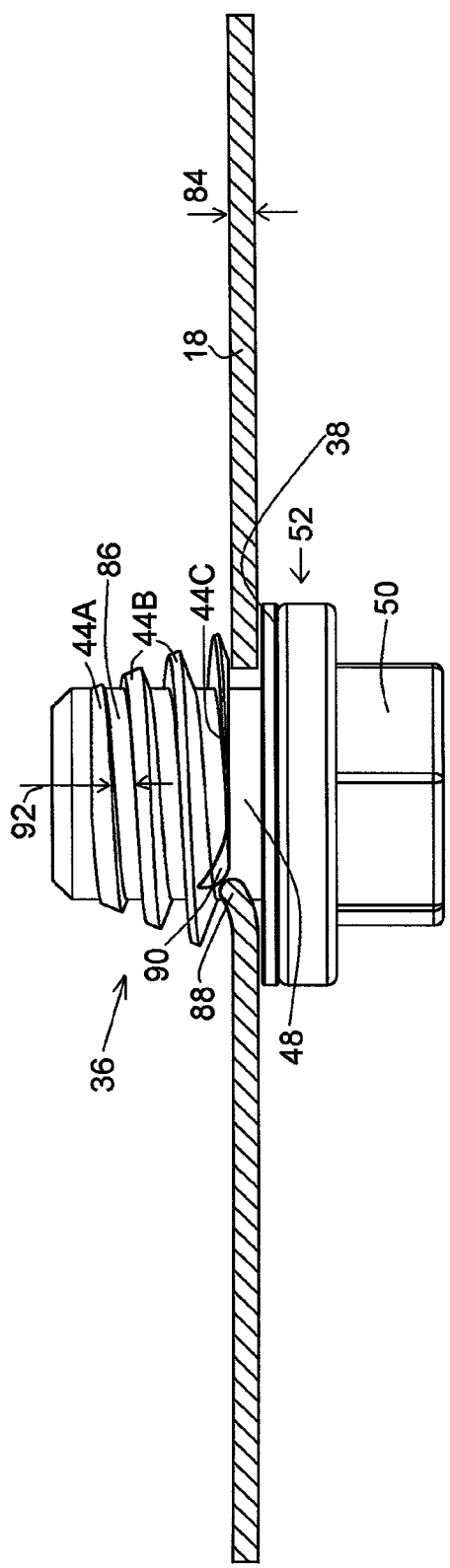
FIG. 2 depicts a self threading nut according to one embodiment of the present invention, and a plate into which the nut is threaded.

FIG. 2 depicts a self threading nut according to one embodiment of the present invention, and a plate into which the nut is threaded.

In contrast to conventional self-tapping threads, the internal binding 44C of the self-tapping thread 36 of a nut 10 according to the present invention, does not reach the surface 38 of head 52. There is no end to self-tapping thread 36, i.e., there is a space 48, along the entire width of the thread, between the internal binding 44C of self-tapping thread 36 and surface 38 of head 52.

Production of space 48 forms the internal binding 44C of nut 10 to be thinner than that of bindings 44B.

Upon insertion of self-tapping thread 36 into the pre-fitted hole 54 (shown in FIG. 3) of plate 18 having the thickness 84, substantially of the gap 86, the external binding 44A produces the local bending 88 of plate 18, which enlarges further by the central bindings 44B.

Bending 88 of plate 18 inserts into gap 86 between the bindings (44A, 44B, 44C), and leads the threading, to provide linear motion of closing nut 10. Once bending 88 reaches space 48, the linear movement ceases.

Since the internal binding 44C is relatively thin, upon further closing of nut 10, bending 88 of plate 18 bends the end 90 of the internal binding 44C. Thus, the internal binding 44C no longer leads bending 88 of plate 18 within gap 86, even upon rotating nut 10 to be opened.

Thus, nut 10 is rotatable in relation to plate 18, even though nut 10 is not releaseable from profile 18.

Figure 3:
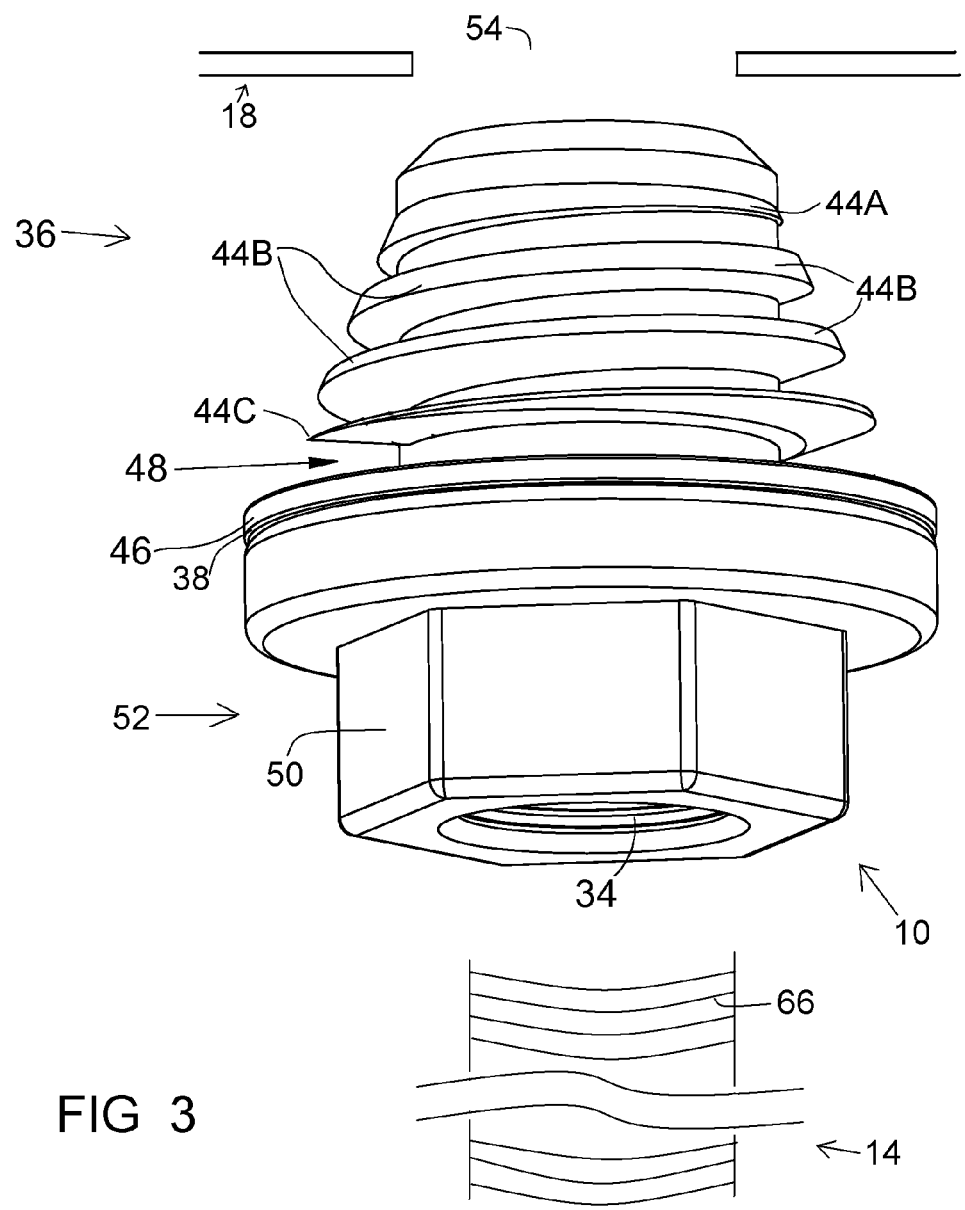
FIG. 3 depicts a nut, according to one embodiment of the present invention, and a metal profile for fixing the screw thereinto.

FIG. 3 is a perspective view of the nut of FIG. 2, and the metal plate or profile for fixing the screw thereinto, and a bolt.

Nut 10 preferably includes an elastic washer 46, disposed in the space 48 between the internal binding 44C of self-tapping thread 36 and surface 38 of head 52. Elastic washer 46 is intended for limiting movement between the self-tapping thread 36 and plate/object 18 upon completing the threading therebetween. The limiting of the movement avoids vibrations.

Nut 10 includes a female thread 34 for threading thereinto a bolt 14 having a male thread 66 fitting thereto; head 52 including a plurality of surfaces 50, such as hex surfaces for rotating nut 10; and the self-tapping thread 36, for producing bending 88, depicted in FIGS. 1 and 2, in the pre-fitted hole 54 of plate or profile 18.

Figure 4:
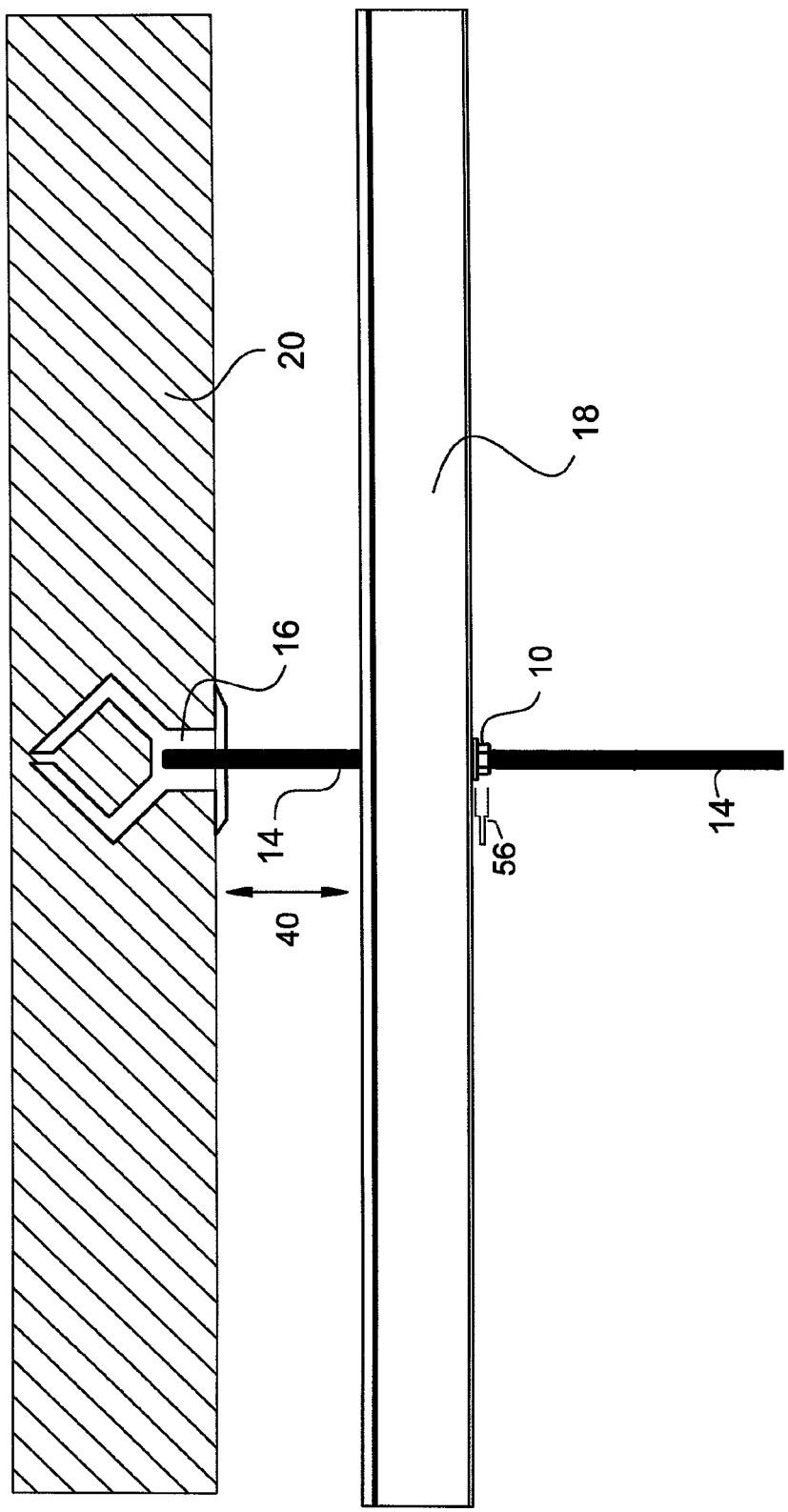
FIG. 4 depicts the first, second and third step, for fixing of the profile of FIG. 3 to a wall or to a ceiling by the nut of FIG. 3.

Self-tapping thread 36 is hollow and includes female thread 34 allowing inserting bolt 14 therethrough, as depicted in FIG. 4.

FIG. 4 depicts the first, second and third step, for fixing of the profile of FIG. 3 to a wall or to a ceiling by the nut of FIG. 3.

At the first step, the installer fixes nut 10 to profile 18. As explained in FIG. 3, nut 10 is free to rotate in relation to profile 18, even though nut 10 is conventionally not releaseable from profile 18.

At the second step, the installer fixes a wall plug 16 to the ceiling 20 or wall or other building structure.

At the third step, the installer screws thread 66 (depicted in FIG. 3) of bolt 14 into female thread 34 (depicted in FIG. 3) of nut 10 in relation to nut 10. While threading bolt 14 into nut 10, head 52 of nut 10 is to be held by a spanner 56. Typically, washer 46 may be sufficient for not requiring spanner 56 for not allowing rotation of nut 10 this case. The installer further rotates bolt 14 into wall plug 16 until being fixed thereto.

At the end of the third step, bolt 14 does not allow changing the distance 40 between wall or ceiling 20 and profile 18, since bolt 14 is not any more rotatable.

Figure 5:
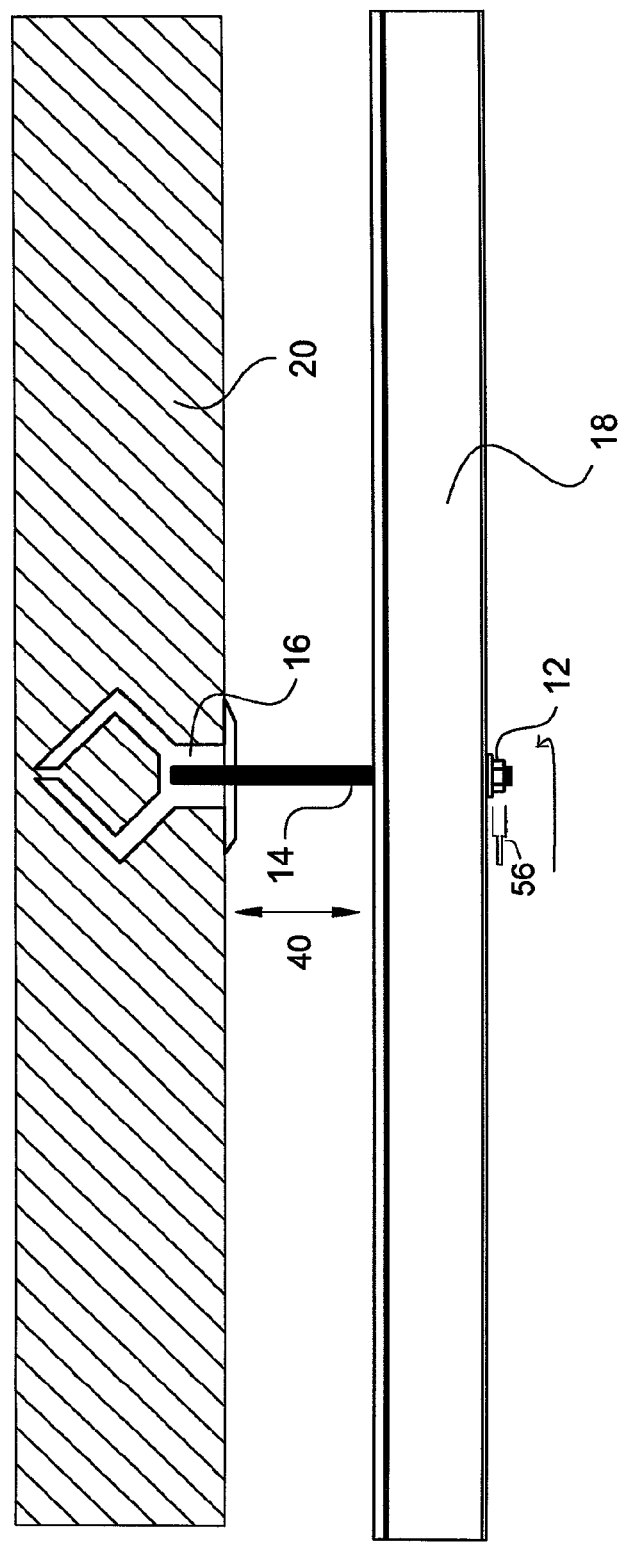
FIG. 5 depicts the fourth step of adjusting of the distance of the profile of FIG. 3 to the wall or ceiling of FIG. 4.

FIG. 5 depicts the fourth step of adjusting of the distance of the profile to the wall or ceiling of FIG. 4.

At the fourth step, the installer rotates nut 10 in relation to bolt 14 (which is not any more rotatable), for adjusting the distance of profile 18 to ceiling 20.

At the fifth step, the installer may remove the screw driver from bolt 14, and may cut the remainder of bolt 14.

Figure 6:
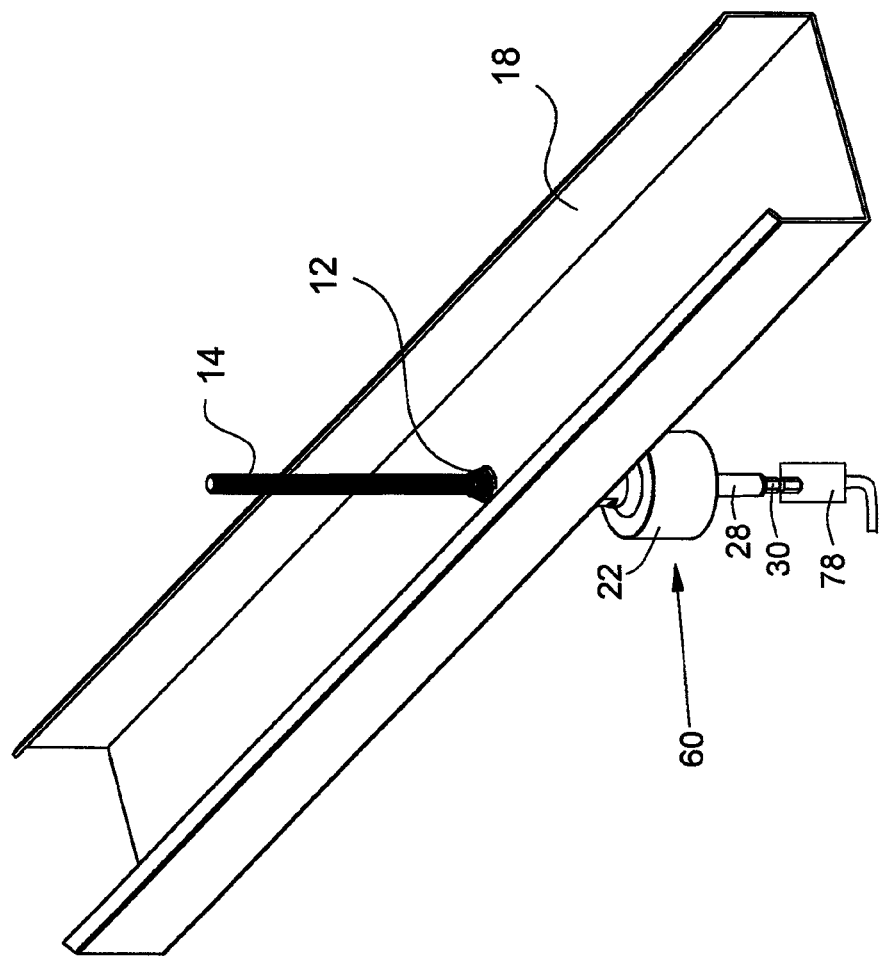
FIG. 6 depicts a tool for rotating the long bolt, and for later releasing the long bolt from the tool.

FIG. 6 depicts a tool for rotating the long bolt, and for later releasing the long bolt from the tool.

A one-directional rotating tool 60 may grip bolt 14, upon rotating bolt 14, through the one-directional rotating tool 60, towards the ceiling; and may release bolt 14 upon "attempting" to rotate bolt, through the one-directional rotating tool 60, to the opposite direction. An electric screw driver 78 may rotate the bottom element 28 of one-directional rotating tool 60 via a hex element 30 of bottom element 28.

Figure 7:
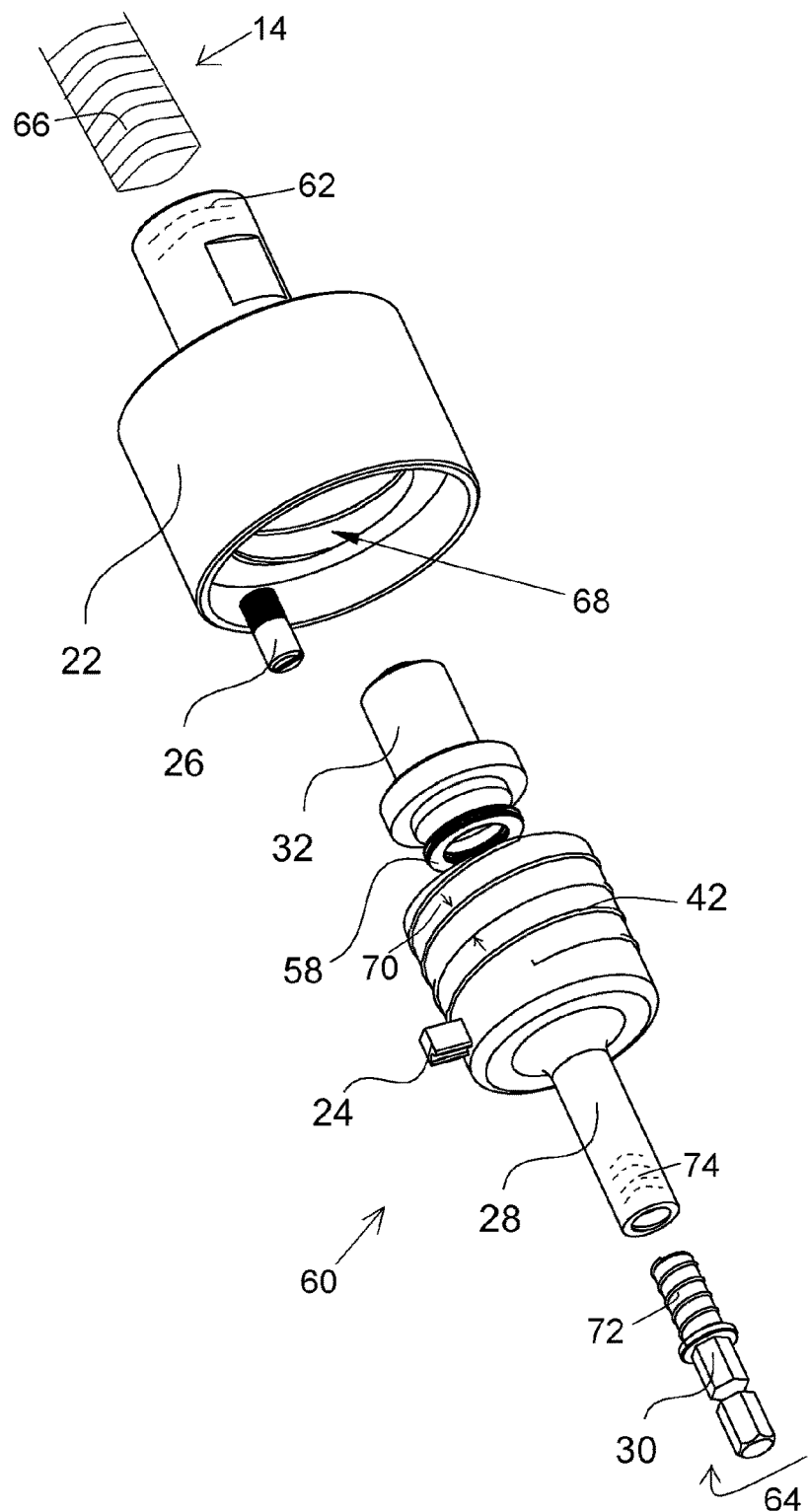
FIG. 7 is an exploded view of the tool of FIG. 6.

FIG. 7 is an exploded view of the tool of FIG. 6.

A male thread 72 of hex element 30 is permanently fixed to a female thread 74 of the bottom element 28.

Upon rotating hex element 30 to the closing direction depicted by arrow 64, the male thread 66 of bolt 14 is inserted into a female thread 62 of the top element 22 of tool 60.

Male thread 66 of bolt 14 and female thread 62 of the top element 22 of gripping tool 60 are tightened one towards the other by a tightening element 32, being pressed by the bottom element 28.

Rotation of the bottom element 28 rotates a male thread 42 thereof into a female thread 68 of the top element 22.

This rotation of the bottom element 28 also presses the central element 32, named above the "tightening element".

Central element 32 presses male thread 66 of bolt 14 outside from female thread 62 of the top element 22 of tool 60, thereby providing friction therebetween, thus making the separation between them difficult.

In addition to this difficulty, upon rotating hex element 30 opposite to arrow 64, male thread 42 opens in relation to female thread 68 thereof before male thread 66 of bolt 14 opens in relation to female thread 62 of top element 22; this, since the pace 70 of threads 42 and 68 is significantly larger than the pace of threads 66 and 62.

Thus, threads 68 and 42 have an easier opening extent, since threads 42 and 68 have smaller friction length and area therebetween than the friction length and area of threads 66 and 62. Thus, threads 42 and 68 open, one from the other, by a smaller pressure than any other thread in the system, and therefore it opens first.

Figure 8:
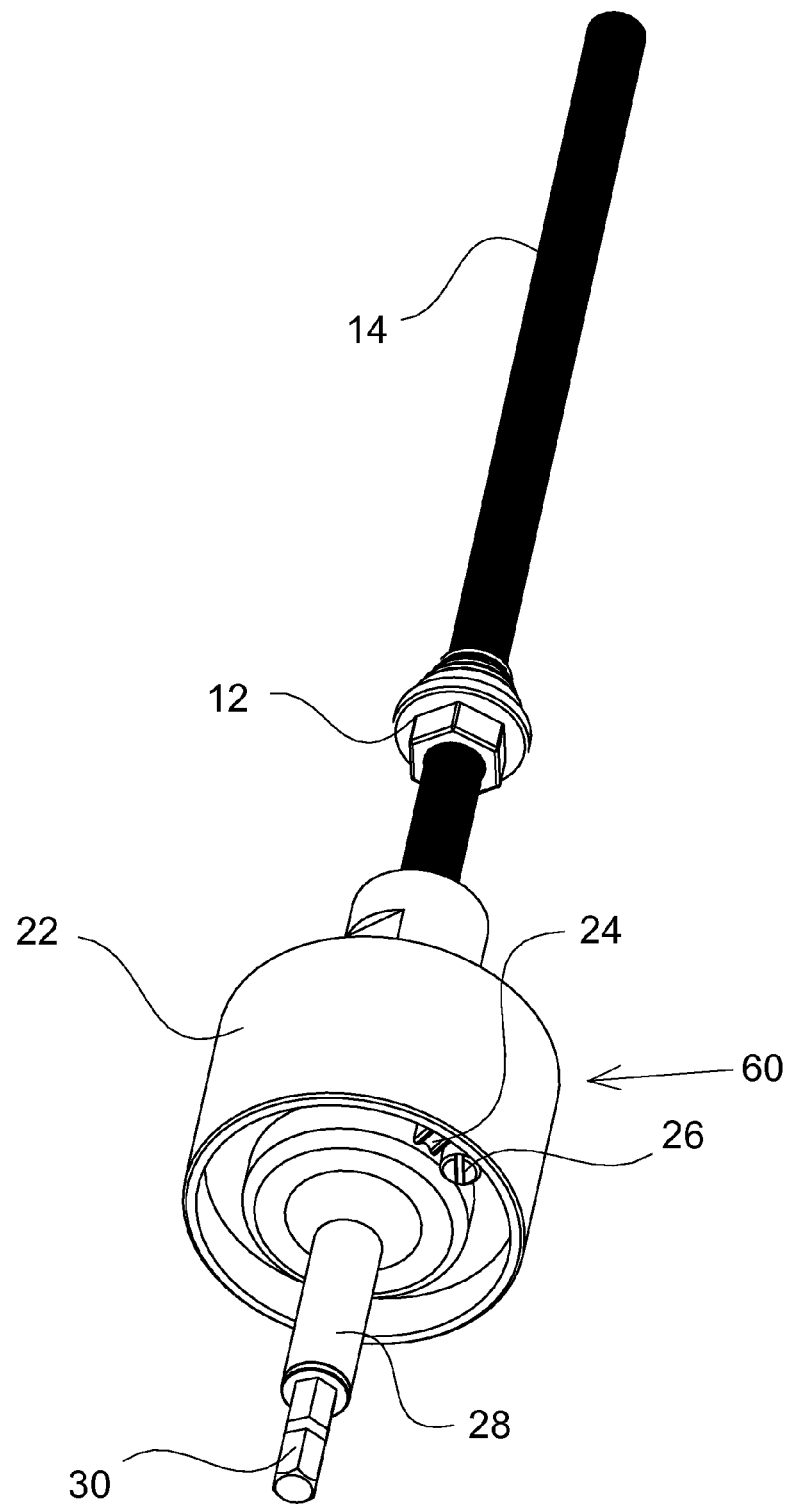
FIG. 8 is an assembled view of the tool of FIG. 7.

FIG. 8 is an assembled view of the tool of FIG. 7.

Figure 9:
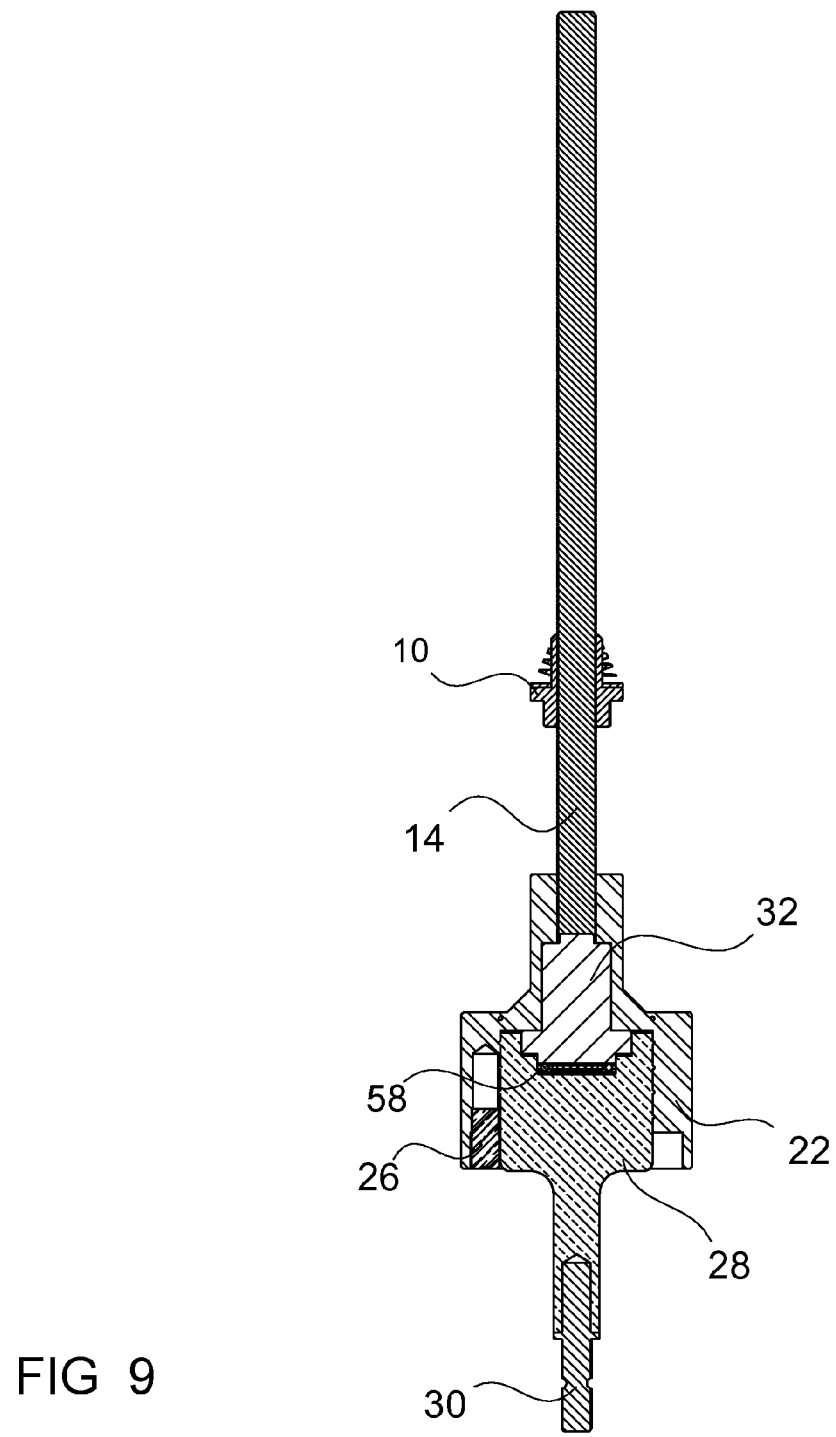
FIG. 9 is a cross-sectional view of the tool of FIG. 7, including the nut and bolt of FIG. 3.

FIG. 9 is a cross-sectional view of the tool of FIG. 7, including the nut and the bolt of FIG. 3.

The opening of thread 42 of the bottom element 28 from thread 68 of the top element 22 does not separate the bottom element 28 from the top element 22, due to a protrusion 24 of the bottom element 28 and a protrusion 26 of the top element 22, being blocked one by the other.

The opening of thread 42 of the bottom element 28 from thread 68 of the top element 22 releases the tightening of male thread 66 of bolt 14 towards female thread 62 of the top element 22 by central element 32, thus releasing bolt 14.

In the figures and/or description herein, the following reference numerals (Reference Signs List) have been mentioned:
numeral 10 denotes a nut, according to one embodiment of the present invention;
numeral 12 denotes a prior art self threading nut;
numeral 14 denotes an elongated bolt;
numeral 16 denotes a wall plug;
numeral 18 denotes a metal profile or a plate or another object, to be hung to a building structure;
numeral 20 denotes the ceiling or wall or other building structure, for fixing the object thereto;
numeral 22 denotes the top element of the gripping tool; the terms "top" and "bottom" refer to hanging the profile on the ceiling, being at the top;
numeral 24 denotes a protrusion of the bottom element;
numeral 26 denotes a protrusion of the top element;
numeral 28 denotes the bottom element of the gripping tool;
numeral 30 denotes a hex element;
numeral 32 denotes the central element of the gripping element;
numeral 34 denotes a female thread in the nut;
numeral 36 denotes a self-tapping thread;
numeral 38 denotes a surface of the head of the nut;
numeral 40 denotes the distance between the profile and the ceiling;
numeral 42 denotes a male thread;
numeral 44A denotes the first binding, being the external binding, of the self-tapping thread;
numeral 44B denotes the bindings except for the external and the internal bindings of the self-tapping thread;
numeral 44C denotes the internal binding of the self-tapping thread;
numeral 46 denotes a washer, which may be of silicon, for increasing the friction;
numeral 48 denotes a space between the internal binding of the self-tapping thread of a nut and a surface of the nut;
numeral 50 denotes a surface of the head of the nut;
numeral 52 denotes the head of the nut;
numeral 54 denotes a hole in a plate, perimeter thereof fitted to the self-tapping thread;
numeral 56 denotes a spanner;
numeral 58 denotes a bearing;
numeral 60 denotes a gripping tool;
numeral 62 denotes a female thread;
numeral 64 denotes an arrow;
numeral 66 denotes a male thread of the bolt;
numeral 68 denotes a female thread;
numeral 70 denotes the pace of the thread;
numeral 72 denotes a male thread;
numeral 74 denotes a female thread;
numeral 78 denotes a screw driver;
numeral 80 denotes the width of a binding;
numeral 84 denotes the thickness of the metal profile or the plate or the other object, to be hung to the building structure;
numeral 86 denotes the gap between the bindings of the thread;
numeral 88 denotes a local bending in the hole in the plate;
numeral 90 denotes the end of the internal binding; and
numeral 92 denotes the width of the gap between the bindings of the thread.

In the description herein, the following references have been mentioned:

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A nut (10), comprising:
a female thread (34) for threading a bolt (14) thereinto;
a head (52) surrounding said female thread (34), for holding said female thread (34), for allowing rotating the bolt (14) in relation to said female thread (34); and
a self-tapping thread (36), for threading said nut (10) through an object (18), said self-tapping thread (36) characterized in not providing linear pacing in relation to the object (18) upon rotation therebetween upon completing the threading therebetween, wherein said self-tapping thread (36) comprises said female thread (34) for threading the bolt (14) therethrough, thereby allowing connecting said nut (10) to the object (18) and then moving the bolt (14) in relation to the object (18) either by rotating the bolt (14) in relation to said nut (10), or by rotating said nut (10) in relation to the object (18), thereby allowing fixing the object (18) to a building structure (20) at an adjustable distance (40), and wherein said character of said self-tapping thread (36) of not providing linear pacing in relation to the object (18) upon rotation therebetween upon completing the threading therebetween, comprises an internal binding (44C) being thinner than the other bindings (44B), thereby upon rotating said nut (10) in relation to said object (18) in a closing direction (64), a bending (88) in a hole (54) in said object (18) bends an end (90) of said internal binding (44C), thereby removing said bending (88) of said object (18) from a gap (86) between the bindings (44B, 44C) of said self tapping thread (36).

2. A tool (60)

for rotating a bolt (14) threaded into a nut (10) upon rotating to a closing direction (64), and for releasing the bolt (14) therefrom upon rotating to an opening direction, said tool (60) comprising:

a first female thread (62), for threading a male thread (66) of the bolt (14) thereinto; and a tightening element (32) pressing the male thread (66) of the bolt (14) outside from said female thread (62), thereby providing friction therebetween, wherein said nut (10) comprises:

a female thread (34) for threading the bolt (14) thereinto;

a head (52) surrounding said female thread (34), for holding said female thread (34), for allowing rotating the bolt (14) in relation to said female thread (34); and a self-tapping thread (36), for threading said nut (10) through an object (18), said self-tapping thread (36) characterized in not providing linear pacing in relation to the object (18) upon rotation therebetween upon completing the threading therebetween, wherein said self-tapping thread (36) comprises said female thread (34) for threading the bolt (14) therethrough, thereby allowing connecting said nut (10) to the object (18) and then moving the bolt (14) in relation to the object (18) either by rotating the bolt (14) in relation to said nut (10), or by rotating said nut (10) in relation to the object (18), thereby allowing fixing the object (18) to a building structure (20) at an adjustable distance (40), and wherein said character of said self-tapping thread (36) of not providing linear pacing in relation to the object (18) upon rotation therebetween upon completing the threading therebetween, comprises a space (48) between an internal binding end (90) of said self-tapping thread (36) and an adjacent surface (38) of said nut (10), said space (48) being substantially larger than a thickness (84) of the object (18), for allowing the object (18) rotate within said space (48).

3. A tool (60) according to claim 2, further comprising:

a male thread (42), for pressing said tightening element (32); and a second female thread (68) fitting to said male thread (42), wherein paces (70) of said male (42) and second female (68) threads are significantly greater than a pace of the thread (66) of the bolt (14), thereby opening said male thread (42) from said second female thread (68) for releasing said tightening element (32), before opening the bolt (14).

* * * * *